Patented July 9, 1946

2,403,686

UNITED STATES PATENT OFFICE 2,403,686

REACTION PRODUCT OF UNSATURATED MONO-GLYCOL ETHERS AND UNSATURATED NITRILES

Edward John Schwoegler, Wyandotte, Mich., assignor to Wyandotte Chemicals Corporation, Wyandotte, Mich., a corporation of Michigan No Drawing. Application November 22, 1944,
Serial No. 564,716

14 Claims. (Cl. 260—345)

The present invention relates to chemical compounds of the following indicated general formula, and their method of preparation:

$$R-O-Y-O-CH_2-\underset{\underset{R^1}{|}}{CH}-C\equiv N$$

R=unsaturated hydrocarbon radical
Y=alkylene group
$R^1$=a hydrogen or alkyl group An example of such product is the following:

$$CH_2=CH-CH_2-O-CH_2-\\CH_2-O-CH_2-CH_2-C\equiv N$$

β(allyloxy ethoxy) propionitrile

Briefly outlined, my invention involves the reaction of a monoglycol ether of an unsaturated alcohol, with an α,β unsaturated open chain nitrile, in the presence of an alkaline condensing agent. Such open chain nitrile possesses the formula:

$$CH_2=C-C\equiv N\\\underset{R}{|}$$

where R is hydrogen or a methyl group, viz:—acrylonitrile or α methyl acrylonitrile.

The mono-glycol ethers of an unsaturated alcohol are suitably prepared by the reaction of olefin oxides and the unsaturated alcohol, such as illustrated by the following chemical equation:—

$$CH_2=CHCH_2OH + CH_2CH_2 \longrightarrow\\\underset{O}{\diagdown\diagup}$$

$$CH_2=CHCH_2OCH_2CH_2OH$$

Such ethers may alternatively be prepared by reaction of the alkali metal salt of the unsaturated alcohol and an olefin chlorhydrin, thusly:

$$CH_2=CHCH_2ONa + CH_2ClCH_2OH \rightarrow\\CH_2=CHCH_2OCH_2CH_2OH + NaCl$$

Mixtures of olefin chlorhydrins, such as ethylene and propylene chlorhydrin may also be employed in the above reaction to produce mixed alcohols which are in turn condensed with an open chain nitrile, as subsequently described.

When such a mono-glycol ether of the unsaturated alcohol is reacted with the open chain nitrile, and in the presence of an alkaline catalyst, the hydrogen of the hydroxy group in the ether attaches itself to the double bonded carbon in the beta position of the nitrile, and the alpha carbon atom of the nitrile becomes linked to the oxygen of such hydroxyl group, substantially as illustrated by the following equation:

$$CH_2=CHCH_2OCH_2CH_2OH + CH_2=CHC\equiv N \xrightarrow[\text{catalyst}]{\text{alkaline}}$$

$$CH_2=CHCH_2OCH_2CH_2OCH_2CH_2CN$$

The products of my present invention are useful intermediates in organic synthesis.

The alkaline condensing or catalytical agents used in the present reaction are of a strongly alkaline nature, such as alkali oxides, hydroxides, amines, alcoholates or phenates; alkali or alkaline earth metals, alkaline earth hydroxides, alkali hydrides, strongly alkaline quaternary ammonia hydroxides and the like. In general, the amount of such condensing agent or catalyst to be used is from ½ to 5% by weight of the unsaturated mono-glycol ether employed in the reaction.

The following unsaturated mono-glycol ethers may be employed in the performance of my present invention: ethylene, propylene and butylene glycol ethers of the following listed unsaturated alcohols:

| | |
|---|---|
| Allyl alcohol | Oleyl alcohol |
| Methylallyl alcohol | Propargyl alcohol |
| Furfuryl alcohol | Cinnamyl alcohol |
| Crotyl alcohol | Geraniol |
| Methylvinylcarbinol | Linalool |
| Allylcarbinol | Citronellol |
| Pentene-1-ol-5 | Alpha terpineol |

In the case of the propylene and butylene ethers of the unsaturated alcohols, it is to be understood that two or more isomers may be formed by interaction of the olefin oxide and the unsaturated alcohol. The inclusion of such isomeric forms of ethers is within the purview and scope of my present invention.

The process is carried out in general by slowly adding acrylo- or methacrylonitrile to the ether containing the catalyst, the rate of addition being regulated so that the temperature of the reaction mixture remains below 70° C. External cooling may be employed if desired. The reactants may be employed in equimolar proportions although it is sometimes advantageous to use a small excess of unsaturated ether.

By way of further explanation and illustration of my invention, in order that it may readily be understood and practiced by those skilled in the art, the following examples are given:

*Example 1*

Mono allyl ether of ethylene glycol in the amount of 671 grams was placed in a reaction vessel fitted with an agitator and surrounded by a jacket suitable for heating or cooling. Methyl alcohol (10 grams) were added to the ether followed by the addition of 5 grams of sodium in small chips. The mixture was agitated until all sodium had dissolved. Acrylonitrile (265 grams) were added to the agitated mixture over a period of 2 hours while the reactants mixture was maintained at a temperature of 18–20° C. The reaction mixture was agitated for 1 hour at the above temperature on completion of acrylonitrile addition and then poured into 200 cc. of water and neutralized with dilute sulfuric acid. The oily layer was separated from the aqueous layer, washed two times with sodium chloride solution, dried and distilled. A water white product boiling at 110° C. at 2 mm. Hg pressure (and weighing 620 grams) was obtained. Its analysis agreed with the formula:

$$CH_2=CH-CH_2-O-CH_2-CH_2-OCH_2-CH_2-C\equiv N$$

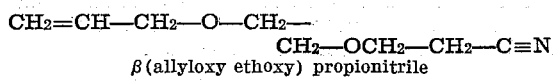
β(allyloxy ethoxy) propionitrile

*Example 2*

Mixed mono allyl ether of propylene glycol (232 grams) were placed in a reaction vessel fitted with an agitator, dropping device and a reflux condenser. Two grams of sodium were added to the ether in small chips and the mixture warmed to 80° C. to effect solution. The solution was cooled to 15° C. by means of an ice bath. Acrylonitrile (98 grams) was added to the agitated glycol ethers containing the dissolved sodium over a period of 3 hours. The temperature of the reaction mass was maintained between 15 and 25° C. during the addition period. After all acrylonitrile had been added, the reaction mass was agitated for 30 minutes at 20° C., poured into water and neutralized with hydrochloric acid. The aqueous layer was separated from the oily condensation product. The crude condensation product was then distilled under vacuum. Two hundred and forty-five grams of the desired condensation products boiling at 138° to 142° C. at 12 mm. Hg pressure were obtained. Analysis showed the products to be β-cyano ethyl ethers of mono allyl propylene glycol ethers.

*Example 3*

One hundred and sixteen grams of 1-allyloxy-propanol-2, prepared by the interaction of sodium allylate and 1-chloro-propanol-2, were condensed with 49 grams of acrylonitrile, 1 gram of sodium being used as a catalyst, by the same procedure as set out in Example 2. One hundred and twenty grams of 1-allyloxy 2(β-cyanoethoxy) propane boiling at 140° to 142° C. at 12 mm. Hg pressure were obtained.

*Example 4*

Metallic sodium (1 gram) in the form of thin chips was dissolved in 108 grams of the furfuryl ether of ethylene glycol by vigorously agitating the mixture at 25° to 28° C. Acrylonitrile (38 grams) was added to the agitated ether over a period of 2 hours while the temperature was maintained below 25° C. by means of an external cooling bath. The reaction mixture was then stirred for ½ hour at 25° C. and poured into water containing just sufficient $H_2SO_4$ to neutralize the dissolved sodium. The oily reaction mass was separated from the aqueous layer, washed with water, dried and distilled. Fifty-four grams of β(furfuroxy ethoxy) propionitrile boiling at 152° to 154° C. at 1 mm. Hg pressure were obtained. Nitrogen analysis showed this compound to be practically pure.

I claim:

1. As a new composition of matter, the reaction product of an ether of a saturated glycol and an unsaturated alcohol, and an α,β unsaturated open chain nitrile.

2. As a new composition of matter, the reaction product of an ether of a saturated glycol and an unsaturated alcohol, and acrylonitrile.

3. As a new composition of matter, β-(allyloxy ethoxy) propionitrile.

4. As a new composition of matter, a mixture of β cyano ethyl ethers of mono allyl propylene glycol ethers.

5. As a new composition of matter, 1-allyloxy, -2 β cyanoethoxy propane.

6. As a new composition of matter, β(furfuroxy ethoxy) propionitrile.

7. The method of making chemical compounds of the formula

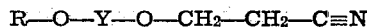
$$R-O-Y-O-CH_2-CH_2-C\equiv N$$

where R is an unsaturated hydrocarbon radical, and Y is an alkylene group, consisting in reacting an ether of a saturated glycol and an unsaturated alcohol with an unsaturated open chain nitrile in the presence of an alkaline condensing agent.

8. The method of making chemical compounds of the formula $$R-O-Y-O-CH_2-CH_2-C\equiv N$$

where R is an unsaturated hydrocarbon radical, and Y is an alkylene group, consisting in reacting an olefin oxide and an unsaturated alcohol, to form an unsaturated mono-glycol ether and then reacting the latter with an open chain nitrile in the presence of an alkaline condensing agent.

9. The method of making chemical compounds of the formula

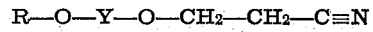
$$R-O-Y-O-CH_2-CH_2-C\equiv N$$

where R is an unsaturated hydrocarbon radical, and Y is an alkylene group, consisting in reacting the sodium salt of an unsaturated alcohol with an olefin chlorhydrin to form an unsaturated mono-glycol ether and then reacting the latter with an open chain nitrile in the presence of an alkaline condensing agent.

10. The method of making chemical compounds of the formula

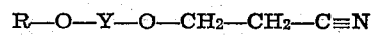
$$R-O-Y-O-CH_2-CH_2-C\equiv N$$

where R is an unsaturated hydrocarbon radical, and Y is an alkylene group consisting in reacting the sodium salt of an unsaturated alcohol with a mixture of ethylene and propylene chlorhydrins to form mixed unsaturated mono-glycol ethers and then reacting the latter with an open chain nitrile in the presence of an alkaline condensing agent.

11. The method of making a chemical compound of claim 3 consisting in reacting mono allyl ether of ethylene glycol with acrylonitrile in the presence of dissolved metallic sodium at a temperature of 18° to 20° C., neutralizing the reaction mixture and then separating and distilling the desired product therefrom.

12. The method of making a chemical compound of claim 4 consisting of reacting a mixture of mono allyl ethers of mono propylene glycol with acrylonitrile in the presence of dissolved metallic sodium at a temperature of 15° to 25° C., neutralizing the reaction mixture, separating and distilling the desired product.

13. The method of making a product of claim 5 consisting in reacting sodium allylate and 1-chloro-propanol-2 to form 1-allyloxy propionol-2, condensing the product thereof with acrylonitrile in the presence of dissolved metallic sodium at a temperature of 15° to 25° C., neutralizing the resultant mixture and then separating and distilling the desired product.

14. The method of making the product of claim 6 consisting in reacting furfuryl ether of ethylene glycol with acrylonitrile in the presence of dissolved metallic sodium at a temperature below 25° C., neutralizing the resultant mixture and then separating and distilling the desired product.

EDWARD JOHN SCHWOEGLER.